(12) United States Patent
Ikura

(10) Patent No.: US 10,811,924 B2
(45) Date of Patent: Oct. 20, 2020

(54) ROTATING ELECTRIC MACHINE

(71) Applicant: Mitsubishi Electric Corporation, Tokyo (JP)

(72) Inventor: Yutaka Ikura, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 344 days.

(21) Appl. No.: 15/534,051

(22) PCT Filed: Apr. 6, 2015

(86) PCT No.: PCT/JP2015/060733
§ 371 (c)(1),
(2) Date: Jun. 8, 2017

(87) PCT Pub. No.: WO2016/162920
PCT Pub. Date: Oct. 13, 2016

(65) Prior Publication Data
US 2018/0316236 A1    Nov. 1, 2018

(51) Int. Cl.
*H02K 3/52* (2006.01)
*H02K 1/14* (2006.01)
(Continued)

(52) U.S. Cl.
CPC ............ *H02K 3/522* (2013.01); *H02K 1/146* (2013.01); *H02K 1/20* (2013.01); *H02K 3/50* (2013.01);
(Continued)

(58) Field of Classification Search
CPC ........... H02K 3/522; H02K 3/50; H02K 3/52; H02K 1/146; H02K 1/20; H02K 2203/09; H02K 7/006
See application file for complete search history.

(56) References Cited

U.S. PATENT DOCUMENTS 6,914,356 B2 * 7/2005 Yamamura ............... H02K 3/50
310/71
7,598,637 B2 * 10/2009 Niehaus ................ H02K 3/522
310/194
(Continued)

FOREIGN PATENT DOCUMENTS

DE    102010030363 A1    12/2011
JP    2000-333400 A    11/2000
(Continued)

OTHER PUBLICATIONS

Machine translation of JP2003-134757 (Year: 2003).*
(Continued)

Primary Examiner — Bernard Rojas
(74) Attorney, Agent, or Firm — Sughrue Mion, PLLC; Richard C. Turner

(57) ABSTRACT

A rotating electric machine is provided with a connection member, formed in the shape of a ring, that is disposed on at least one axis-direction end of a stator core and that mutually connects a plurality of coils; the axis-direction end face, at the stator-opposite side, of the connection member is formed in such a way that at a plurality of different positions in the radial direction of the connection member, the axis-direction positions of the connection member differ from one another.

8 Claims, 5 Drawing Sheets

D-D LINE CROSS-SECTIONAL VIEW

(51) Int. Cl.
  *H02K 1/20*   (2006.01)
  *H02K 3/50*   (2006.01)
  *H02K 7/00*   (2006.01)

(52) U.S. Cl.
  CPC .............. *H02K 3/52* (2013.01); *H02K 7/006* (2013.01); *H02K 2203/09* (2013.01)

(56) References Cited

U.S. PATENT DOCUMENTS

| | | | | |
|---|---|---|---|---|
| 8,067,867 | B2* | 11/2011 | Ueta | ............... H02K 3/522 310/179 |
| 2002/0047365 | A1* | 4/2002 | Yagyu | ............... H02K 3/50 310/71 |
| 2002/0067094 | A1* | 6/2002 | Okazaki | ............... H02K 3/522 310/180 |
| 2003/0090166 | A1 | 5/2003 | Kobayashi et al. | |

FOREIGN PATENT DOCUMENTS

| | | |
|---|---|---|
| JP | 2002-078272 A | 3/2002 |
| JP | 2002-171708 A | 6/2002 |
| JP | 2003-134757 A | 5/2003 |
| JP | 2005-065374 A | 3/2005 |
| JP | 3733313 B2 | 1/2006 |
| JP | 2009-118575 A | 5/2009 |
| JP | 2009-247061 A | 10/2009 |
| JP | 2012-044829 A | 3/2012 |

OTHER PUBLICATIONS

Machine translation of JP2012-044829 (Year: 2012).*
Machine translation of JP 2002-171708 (Year: 2022).*
Machine translation of JP2009-118575 (Year: 2009).*
Machiune translation of JP200565374A (Year: 2005).*
International Search Report for PCT/JP2015/060733, dated Jun. 30, 2015 [PCT/ISA/210].
Written Opinion for PCT/JP2015/060733, dated Jun. 30, 2015 [PCT/ISA/237].
Communication dated Nov. 7, 2017, from the Japanese Patent Office in counterpart application No. 2017-510808.
Communication dated Nov. 19, 2018, from State Intellectual Property Office of the P.R.C. in counterpart application No. 201580078252.9.

* cited by examiner

D-D LINE CROSS-SECTIONAL VIEW

ROTATING ELECTRIC MACHINE

This is a National Stage of International of Application No. PCT/JP2015/060733 filed Apr. 6, 2015, the contents of all of which are incorporated herein by reference in their entirety.

TECHNICAL FIELD

The present invention relates to a rotating electric machine and particularly to a rotating electric machine provided with a connection member by means of which coils are connected with one another.

BACKGROUND ART

In recent years, due to high need for reducing fuel of a vehicle, the development of a hybrid car has been advanced. A rotating electric machine utilized in a hybrid car has, for example, a rotor provided with a great number of magnetic poles at its outer circumference portion, a stator core having an inner circumference portion facing the outer circumference portion of the rotor through a gap, and a great number of coils mounted in the stator; these coils are connected with one another by a ring-shaped connection member mounted on the axis-direction end of the stator core and are connected with outer power-supply conductors through the connection member.

Because as is well known, a rotating electric machine utilized in a hybrid car is disposed in a narrow space between the engine and the transmission, the outer shape and the axis-direction length thereof are liable to be restricted; thus, it is desired that the foregoing connection member is formed as compact as possible. To date, from such a point of view, there have been made a great number of proposals for the connection member of a rotating electric machine utilized in a hybrid car.

For example, there has been proposed a connection member provided with a ring-shaped insulation holder whose bottom surface is formed in a planar shape and a plurality of arc-shaped bus bars, having the same width, that are arranged in such a way that each of the thickness directions thereof is equal to the radial direction of the insulation holder (e.g., refer to Patent Documents 1 and 2). Because being formed in a relatively compact manner, these conventional connection members can contribute to thinning of a rotating electric machine.

PRIOR ART REFERENCE

Patent Document

[Patent Document 1] Japanese Patent Publication No. 3733313

[Patent Document 2] Japanese Patent Application Laid-Open No. 2000-333400

DISCLOSURE OF THE INVENTION

Problems to be Solved by the Invention

As described above, a rotating electric machine utilized in a hybrid car is disposed in a flat and narrow space between the engine and the transmission; because formed by use of a trimming die, the housing for containing the rotating electric machine to be disposed in the space often has a truncated-cone shape in which the size thereof gradually decreases toward the transmission. Therefore, the outer diameter of the connection member mounted on the axis-direction end, at the transmission side, of the rotating electric machine to be contained in the housing is restricted by a smaller inner diameter of the housing having the truncated-cone shape.

In a conventional connection member, a plurality of bus bars having the same width are arranged to be spaced apart from one another through a gap in the radial direction of the insulation holder; thus, in the case where the outer diameter of the connection member is restricted by the inner diameter of the housing, the thickness of the bus bar cannot be made large and hence it is required to enlarge the width of the bus bar in order to secure the cross-sectional area of the bus bar. As a result, because it is required to extend the axis-direction length of the connection member, there has been a problem that the axis-direction length of the rotating electric machine becomes large.

The present invention has been implemented in order to solve the foregoing problems in a conventional rotating electric machine; the objective thereof is to provide a rotating electric machine that is applicable without extending the axis-direction length thereof, even when disposed in a narrow space of a hybrid car or the like.

Means for Solving the Problems

A rotating electric machine according to the present invention includes a stator having a stator core that includes a yoke portion formed in the shape of a ring and a plurality of tooth portions extending from the yoke portion to the radial-direction inner side of the yoke portion and that contains a rotor in the inner space thereof, a plurality of coils mounted on the plurality of tooth portions, and a connection member, formed in the shape of a ring, that is disposed on at least one axis-direction end of the stator core and that mutually connects the plurality of coils so as to form a predetermined stator coil; the rotating electric machine is characterized in that the axis-direction end face, at the stator-opposite side, of the connection member is formed in such a way that at a plurality of different positions in the radial direction of the connection member, the axis-direction positions of the connection member differ from one another.

Advantage of the Invention

In the rotating electric machine according to the present invention, the axis-direction end face, at the stator-opposite side, of the connection member is formed in such a way that at a plurality of different positions in the radial direction of the connection member, the axis-direction positions of the connection member differ from one another; thus, it is made possible to obtain a rotating electric machine that is applicable without extending the axis-direction length thereof, even when disposed in a narrow space of a hybrid car or the like.

BEST MODE FOR CARRYING OUT THE INVENTION

Embodiment 1

Figure 1A:
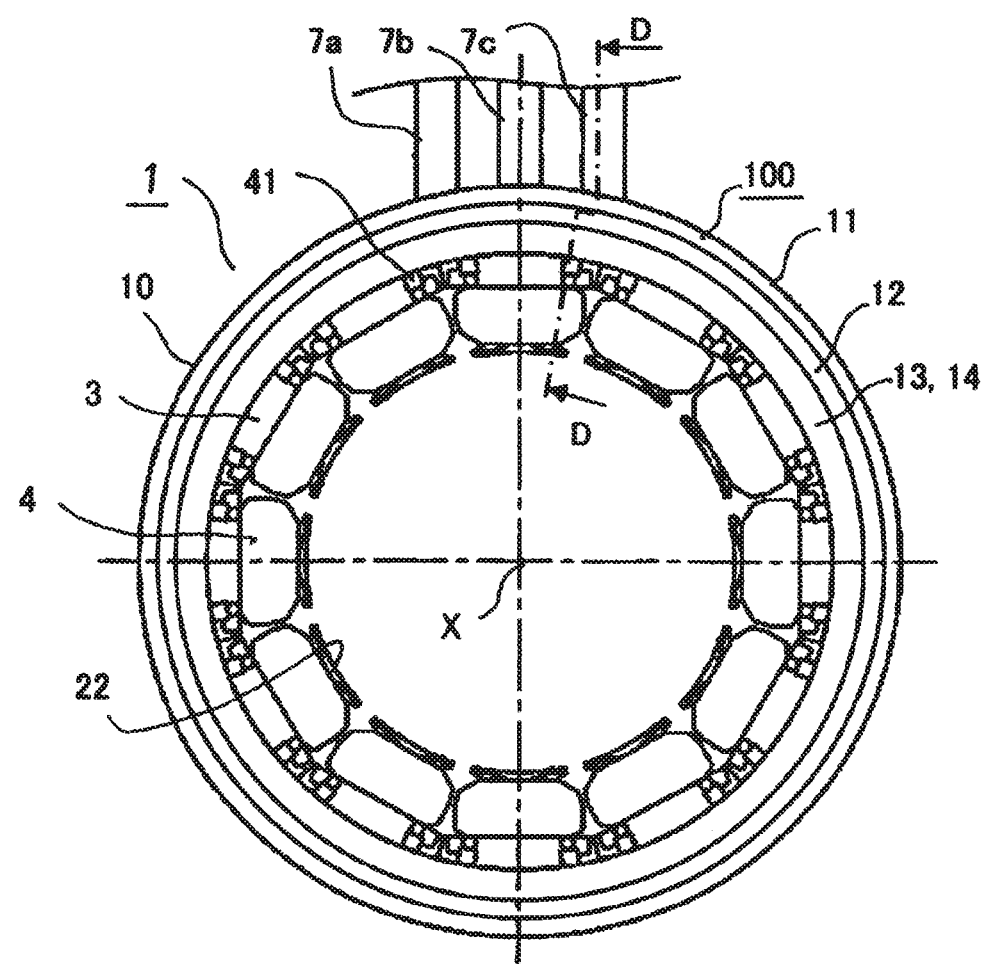
FIG. 1A is a plan view schematically illustrating the respective structures of a connection member according to Embodiment 1 of the present invention and a stator of a rotating electric machine provided with the connection member.
Figure 1B:
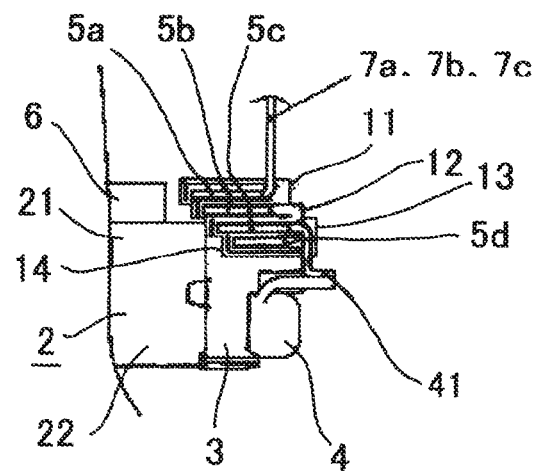
FIG. 1B is a cross-sectional view schematically illustrating the cross section taken along the D-D line in FIG. 1A.

FIG. 1A is a plan view schematically illustrating the respective structures of a connection member according to Embodiment 1 of the present invention and a stator of a rotating electric machine provided with the connection member; FIG. 1B is a cross-sectional view schematically illustrating the cross section taken along the D-D line in FIG. 1A. In FIGS. 1A and 1B, a stator 1 of a rotating electric machine utilized, for example, in a hybrid car is provided with a stator core 2, a bobbin 3, a coil 4, and a connection member 100.

The stator core 2 is formed of a plurality of core pieces by which the stator core 2 is divided in the circumferential direction. Each of the core pieces has a yoke portion 21 and a tooth portion 22 that protrudes from the yoke portion 21 toward the central portion of the stator 1. The respective tooth portions 22 of the core pieces are arranged around the center axis X of the stator 1 in such a way as to be spaced evenly apart from one another.

The yoke portion 21 of each of the core pieces abuts on the yoke portion 21 of the adjacent core piece in the circumferential direction of the stator 1; the yoke portion 21 form the yoke of the stator 1 having a cylindrical shape. Through a predetermined gap, the front end of the tooth portion 22 of each of the core pieces faces the outer circumferential surface of a rotor (unillustrated) provided with a plurality of rotor magnetic poles on the outer circumference portion thereof. The stator 1 having a cylindrical structure is fixed to a frame 6 in such a way as to be pressed into the inner circumference portion of the frame 6 having a cylindrical shape.

The bobbin 3 formed of an insulating material is mounted on the tooth portion 22 of each of the core pieces. The coil 4 is wound around the tooth portion 22 of each of the core piece through the intermediary of the bobbin 3. The connection member 100 formed in a cylindrical shape is mounted on one axle-direction end of the stator 1 at the radial-direction outside of the stator 1 with respect to the coil 4; as described later, the connection member 100 is utilized for mutually connecting respective coil terminals 41, pulled out from the coils 4, so as to form a stator coil connected, for example, in a three-phase Y-connection manner.

The connection member 100 has an insulation holder 10 made of resin. The insulation holder 10 includes a first holder portion 11 situated at the radial-direction outermost side, a second holder portion 12 that makes contact with the radial-direction inner side of the first holder portion 11, a third holder portion 13 that makes contact with the radial-direction inner side of the second holder portion 12, and a fourth holder portion 14 that makes contact with the radial-direction inner side of the third holder portion 13. Accordingly, the first holder portion 11, the second holder portion 12, the third holder portion 13, and the fourth holder portion 14 are formed in such a way that the respective diameters thereof decrease in that order.

As well illustrated in FIG. 1B, in the insulation holder 10 of the connection member 100, one axis-direction end face, at the stator side, of the third holder portion 13 is disposed at a position where the one axis-direction end face of the third holder portion 13 abuts on one axis-direction face end of the yoke portion 21 of the stator core 2; the second holder portion 12 is disposed at a position that is closer to the stator 1 in the axis direction of the stator 1 than the third holder portion 13 is; the first holder portion 11 is disposed at a position that is closer to the stator 1 in the axis direction of the stator 1 than the second holder portion 12 is; the fourth holder portion 14 is disposed at a position that is farther from the stator 1 (hereinafter, referred to also as "a stator-opposite side") in the axis direction of the stator 1 than the third holder portion 13 is. The first holder portion 11, the second holder portion 12, and the third holder portion 13 have approximately the same width, i.e., approximately the same longitudinal length. The fourth holder portion 14 is formed in such a way as to be slightly smaller in width than each of the first, second, and third holder portions 11 through 13 is; the axis-direction end, at the stator-opposite side, of the fourth holder portion 14 is on a plane the same as the plane on which the axis-direction end, at the stator-opposite side, of the third holder portion 13 is. For example, injection molding is integrally applied to the first through fourth holder portions 11 through 14, so that they are integrally fixed with one another.

Because the insulation holder 10 of the connection member 100 is formed in such a manner as described above, the axis-direction end face thereof at the stator 1 side, i.e., the bottom surface thereof is formed not in a flat shape but in a stepped form; the axis-direction end face thereof at the stator-opposite side is also formed not in a flat shape but in a stepped form.

In the first holder portion 11, there is embedded a U-phase bus bar 5a, as a first bus bar, that is disposed in such a way that the transverse direction thereof is in parallel with the direction in which the center axis X of the stator 1 extends and that the thickness direction thereof is the same as the radial direction of the stator 1. In the second holder portion 12, there is embedded a V-phase bus bar 5b, as a second bus bar, that is disposed in such a way that the transverse direction thereof is in parallel with the direction in which the center axis X of the stator 1 extends and that the thickness direction thereof is the same as the radial direction of the stator 1. In the third holder portion 13, there is embedded a W-phase bus bar 5c, as a third bus bar, that is disposed in such a way that the transverse direction thereof is in parallel with the direction in which the center axis X of the stator 1 extends and that the thickness direction thereof is the same as the radial direction of the stator 1. In the fourth holder portion 14, there is embedded an N-phase bus bar 5d, as a fourth bus bar, that is a neutral line disposed in such a way that the transverse direction thereof is in parallel with the direction in which the center axis X of the stator 1 extends and that the thickness direction thereof is the same as the radial direction of the stator 1. The N-phase bus bar 5d is the neutral line of a Y-connection stator coil.

The U-phase bus bar 5a as the first bus bar, the V-phase bus bar 5b as the second bus bar, and the W-phase bus bar 5c as the third bus bar are formed in such a way as to have approximately the same width and thickness. As far as the N-phase bus bar 5d as the fourth bus bar is concerned, the thickness thereof is approximately the same as that of each of the bus bars 5a through 5c; however, the width thereof is set to be slightly smaller than that of each of the bus bars 5a through 5c.

The respective coil terminals 41, pulled out from the coils 4, are selectively connected with the U-phase bus bar 5a, the V-phase bus bar 5b, the W-phase bus bar 5c, and the N-phase bus bar 5d of the connection member 100 so that a three-phase Y-connection, for example, is realized. The U-phase bus bar 5a, the V-phase bus bar 5b, and the W-phase bus bar 5c are connected with an external U-phase power-supply terminal 7a, an external V-phase power-supply terminal 7b, and an external W-phase power-supply terminal 7c, respectively.

In the rotating electric machine, configured as described above, according to Embodiment 1 of the present invention, the coils 4 are mutually connected with one another, as described above, by use of the connection member 100 mounted on the one axis-direction end of the stator 1, so that a predetermined stator coil in the shape of a three-phase Y-connection or the like is formed.

The insulation holder 10 in the connection member 100 according to Embodiment 1 of the present invention is provided with the first holder portion 11, the second holder portion 12, the third holder portion 13, and the fourth holder portion 14; the first, second, third, and fourth holder portions 11 through 14 are formed in such a way that the respective diameters thereof decrease in that order; moreover, the first, second, third, and fourth holder portions 11 through 14 are formed in such a way that the respective axis-direction end faces at the stator side sequentially shift in that order at the stator-opposite side; furthermore, the first, second, and third holder portions 11 through 13 are formed in such a way that the respective axis-direction end faces at the stator-opposite side sequentially shift in that order at the stator-opposite side. The respective axis-direction end faces, at the stator-opposite side, of the third holder portion 13 and the fourth holder portion 14 are formed in such a way as to be on the approximately the same plane.

In the connection member 100, configured as described above, according to Embodiment 1 of the present invention, the axis-direction end face, at the stator side, of the insulation holder 10 is formed in such a way that the closer to the axis center thereof, the more the portion thereof is recessed in a stepped manner at the stator-opposite side; thus, the connection member 100 can be disposed in the stator 1 in such a way as to cover the axis-direction end of the stator 1 in the axis direction; as a result, the axis-direction length of the rotating electric machine can be shortened.

Furthermore, because the axis-direction end face, at the stator-opposite side, of the insulation holder 10 is formed in such a way that the closer to the axis center thereof, the more the portion thereof protrudes in a stepped manner at the stator-opposite side, the end face, at the stator-opposite side, of the insulation holder 10 macroscopically forms part of a cone that protrudes at the stator-opposite side from the radial-direction outer side to the radial-direction inner side; thus, the insulation holder 10 matches with the inside of a hybrid-car housing whose inner diameter decreases in a conical manner so that it can contain the rotating electric machine. In other words, the shape of the housing that contains a rotating electric machine disposed in a space between the engine and the transmission of a hybrid car can be downsized in comparison with a conventional housing.

Figure 5A:
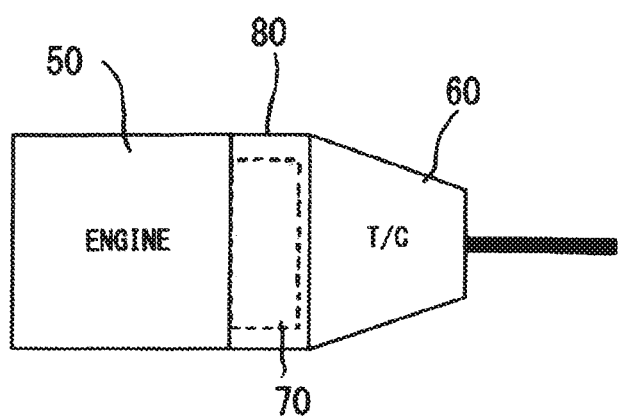
FIG. 5A is an explanatory view illustrating the location of a conventional rotating electric machine.
Figure 5B:
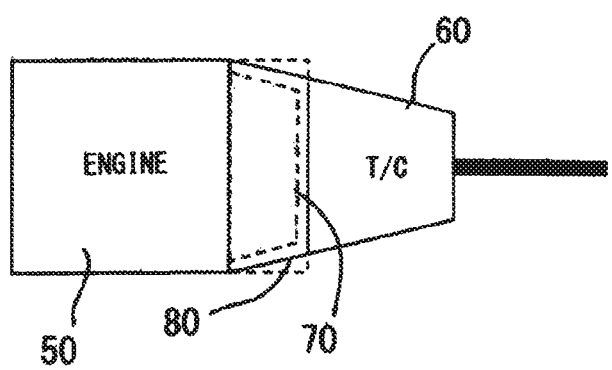
FIG. 5B is an explanatory view illustrating the location of a rotating electric machine according to the present invention.

That is to say, FIG. 5A is an explanatory view illustrating the location of a conventional rotating electric machine; FIG. 5B is an explanatory view illustrating the location of a rotating electric machine according to the present invention. In the case of the conventional apparatus illustrated in FIG. 5A, due to the draft angle of the die, the inner diameter of a housing 80, which is made of aluminum and is provided between an engine 50 and a transmission 60, gradually decreases from the opening portion thereof at the side of the engine 50 to the bottom portion thereof at the side of the transmission 60. The bottom portion of the housing 80, i.e., the corner of the end portion thereof at the side of the transmission is formed in a smoothly arc-shaped manner; in some cases, a protrusion for bolting is formed at the rear side of the housing. Because in general, a connection member is often disposed on an axis-direction end face of a rotating electric machine 70, it is required to determine the outer diameter of the connection member in accordance with the inner diameter of the housing 80 that contains the connection member; in the case where in the housing 80, the connection member is situated at the side of the transmission, the size of the connection member needs to be determined in accordance with the minimum diameter of the housing 80.

In the case of the rotating electric machine, illustrated in FIG. 5B, that is provided with the connection member according to Embodiment 1 of the present invention, the shape of the axis-direction end of the rotating electric machine 70 disposed inside the housing can be formed in such a way as to be part of a cone; thus, the shape of the housing 80 provided between the engine 50 and the transmission 60 can be formed in such a way as to be part of a cone, in accordance with the shape of the rotating electric machine, and hence the space in which the rotating electric machine 70 is disposed can be saved. Because the axis-direction cross-sectional shape of the insulation holder 10 is formed in a stepped manner, the connection member 100 according to Embodiment 1 of the present invention can be disposed in such a way as to avoid protruding portions such as the arc-shaped portion at the corner of the axis-direction end, at the side of the transmission 60, of the housing 80, and the protrusion for bolting; thus, in comparison with the conventional connection member formed not in a stepped manner but in a rectangular manner, not only the cross-sectional area of the connection member but also the cross-sectional area of the bus bar can be enlarged.

Embodiment 2

Figure 2:
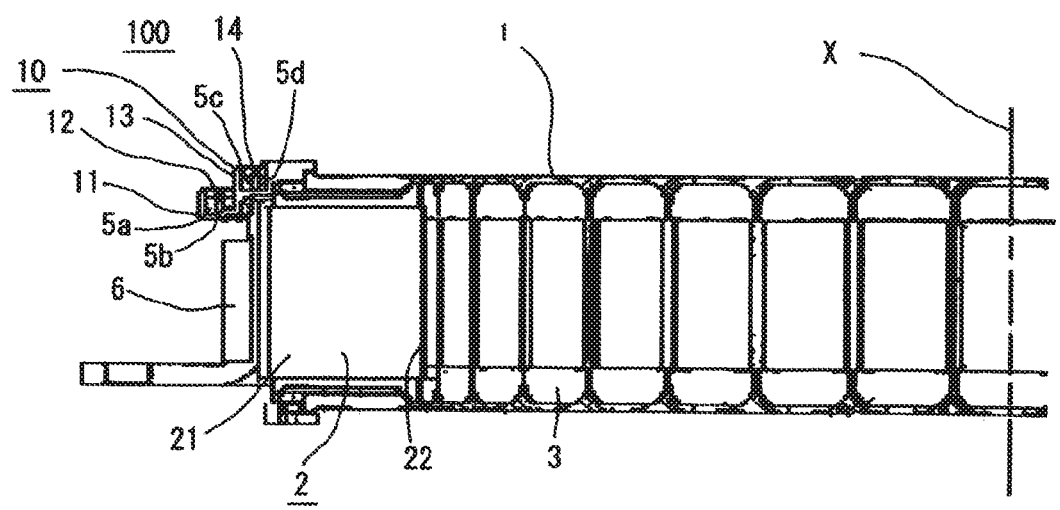
FIG. 2 is a cross-sectional view schematically illustrating the respective structures of a connection member according to Embodiment 2 of the present invention and a stator of a rotating electric machine provided with the connection member.

FIG. 2 is a cross-sectional view schematically illustrating the respective structures of a connection member according to Embodiment 2 of the present invention and a stator of a rotating electric machine provided with the connection member. In FIG. 2, a stator 1 of a rotating electric machine utilized, for example, in a hybrid car is provided with a stator core 2, a bobbin 3, a coil (unillustrated) contained in the bobbin 3, and a connection member 100.

As is the case with Embodiment 1, the stator core 2 is formed of a plurality of core pieces by which the stator core 2 is divided in the circumferential direction. Each of the core pieces has a yoke portion 21 and a tooth portion 22 that protrudes from the yoke portion 21 toward the central portion of the stator 1. The respective tooth portions 22 of the core pieces are arranged around the center axis of the stator 1 in such a way as to be spaced evenly apart from one another.

The yoke portion 21 of each of the core pieces abuts on the yoke portion 21 of the adjacent core piece in the circumferential direction of the stator 1; the yoke portion 21 form the yoke of the stator 1 having a cylindrical shape. Through a predetermined gap, the front end of the tooth portion 22 of each of the core pieces faces the outer circumferential surface of a rotor (unillustrated) provided with a plurality of rotor magnetic poles on the outer circumference portion thereof. The stator 1 having a cylindrical structure is fixed to a frame 6 in such a way as to be pressed into the inner circumference portion of the frame 6 having a cylindrical shape.

The bobbin 3 formed of an insulating material is mounted on the tooth portion 22 of each of the core pieces. The coil is wound around the tooth portion 22 of each of the core piece through the intermediary of the bobbin 3. The connection member 100 formed in a cylindrical shape is mounted on one axle-direction end of the stator 1 at the radial-direction outside of the stator 1 with respect to the coil 4; the connection member 100 is utilized for mutually connecting respective coil wiring terminals (unillustrated), pulled out from the coils, so as to form a stator coil connected, for example, in a three-phase Y-connection manner.

The connection member 100 has an insulation holder 10 made of resin. The insulation holder 10 includes a first holder portion 11 situated at the radial-direction outermost side, a second holder portion 12 that makes contact with the radial-direction inner side of the first holder portion 11, a third holder portion 13 that makes contact with the radial-direction inner side of the second holder portion 12, and a fourth holder portion 14 that makes contact with the radial-direction inner side of the third holder portion 13. The first holder portion 11, the second holder portion 12, the third holder portion 13, and the fourth holder portion 14 are formed in such a way that the respective diameters thereof decrease in that order.

In the insulation holder 10 of the connection member 100, one axis-direction end face, at the stator side, of each of the third holder portion 13 and the fourth holder portion 14 is disposed at a position where the one axis-direction end face of each of the third holder portion 13 and the fourth holder portion 14 abuts on one axis-direction face end of the yoke portion 21 of the stator core 2; the second holder portion 12 and the fourth holder portion 14 are each disposed at positions that are closer to the stator 1 in the axis direction of the stator 1 than the third holder portion 13 and the fourth holder portion 14 are. The respective axis-direction end faces, i.e., the respective bottom surfaces, at the stator side, of the first holder portion 11 and the second holder portion 12 are formed in such a way as to be on approximately the same plane; the respective axis-direction end faces, i.e., the respective bottom surfaces, at the stator side, of the third holder portion 13 and the fourth holder portion 14 are formed in such a way as to be on approximately the same plane. The first holder portion 11 and the second holder portion 12 are arranged at approximately the same position in the axis direction; the third holder portion 13 and the fourth holder portion 14 are arranged at approximately the same position in the axis direction. For example, injection molding is integrally applied to the first through fourth holder portions 11 through 14, so that they are integrally fixed with one another.

Because the insulation holder 10 of the connection member 100 is formed in such a manner as described above, the axis-direction end face thereof at the stator 1 side, i.e., the bottom surface thereof is formed not in a flat shape but in a stepped form; the axis-direction end face thereof at the stator-opposite side is also formed not in a flat shape but in a stepped form.

In the first holder portion 11, there is embedded a U-phase bus bar 5a, as a first bus bar, that is disposed in such a way that the transverse direction thereof is in parallel with the direction in which the center axis X of the stator 1 extends and in such a way that the thickness direction thereof is the same as the radial direction of the stator 1. In the second holder portion 12, there is provided a V-phase bus bar 5b, as a second bus bar, that is disposed in such a way that the transverse direction thereof is in parallel with the direction in which the center axis X of the stator 1 extends and in such a way that the thickness direction thereof is the same as the radial direction of the stator 1. In the third holder portion 13, there is provided a W-phase bus bar 5c, as a third bus bar, that is disposed in such a way that the transverse direction thereof is in parallel with the direction in which the center axis X of the stator 1 extends and in such a way that the thickness direction thereof is the same as the radial direction of the stator 1. In the fourth holder portion 14, there is provided a N-phase bus bar 5d, as a fourth bus bar, that is disposed in such a way that the transverse direction thereof is in parallel with the direction in which the center axis X of the stator 1 extends and in such a way that the thickness direction thereof is the same as the radial direction of the stator 1. The N-phase bus bar 5d is the neutral line of a Y-connection stator coil. It may be allowed that the space where the bus bars of the first through fourth holder portions 11 through 14 are provided is filled with an insulating resin or the like so that the bus bars are completely insulated from the outside.

The U-phase bus bar 5a as the first bus bar, the V-phase bus bar 5b as the second bus bar, and the W-phase bus bar 5c as the third bus bar, described above, are formed in such a way as to have respective different thicknesses and widths but have approximately the same cross-sectional area. The N-phase bus bar 5d, as the fourth bus bar, is formed in such a way as to have a thickness and a width that are different from those of each of the U-phase bus bar 5a, the V-phase bus bar 5b, and the W-phase bus bar 5c and in such a way as to have a cross-sectional area that is smaller than that of each of the U-phase bus bar 5a, the V-phase bus bar 5b, and the W-phase bus bar 5c. The U-phase bus bar 5a, the V-phase bus bar 5b, and the W-phase bus bar 5c can be formed in such a way that the respective thicknesses and the widths thereof are arbitrarily ones; the fourth bus bar 5d can also be formed in such a way that the thickness and the width thereof are arbitrarily ones.

The respective coil terminals (unillustrated), pulled out from the coils, are selectively connected with the U-phase bus bar 5a, the V-phase bus bar 5b, the W-phase bus bar 5c, and the N-phase bus bar 5d of the connection member 100 so that a three-phase Y-connection, for example, is realized. The U-phase bus bar 5a, the V-phase bus bar 5b, and the W-phase bus bar 5c are connected with an external U-phase power-supply terminal, an external V-phase power-supply terminal, and an external W-phase power-supply terminal (none of them are illustrated), respectively.

In the rotating electric machine, configured as described above, according to Embodiment 2 of the present invention, the coils 4 are mutually connected with one another, as described above, by use of the connection member 100 mounted on the one axis-direction end of the stator 1, so that a predetermined stator coil in the shape of a three-phase Y-connection or the like is formed.

The insulation holder 10 in the connection member 100 according to Embodiment 2 of the present invention is provided with the first holder portion 11, the second holder portion 12, the third holder portion 13, and the fourth holder portion 14; the first, second, third, and fourth holder portions 11 through 14 are formed in such a way that the respective diameters thereof decrease in that order; moreover, the respective axis-direction end faces, at the stator side, of the first holder portion 11 and the second holder portion 12 are formed in such a way as to be on the approximately the same plane; the respective axis-direction end faces, at the stator side, of the third holder portion 13 and the fourth holder portion 14 are formed in such a way as to be on the approximately the same plane. With respect to the first holder portion 11 and the second holder portion 12, the third holder portion 13 and the fourth holder portion 14 are arranged in such a way as to be shifted to the stator-opposite side in the direction in which the center axis X of the stator 1 extends. As illustrated in FIG. 2, the cross section of the insulation holder 10 has a comb-like shape.

In the connection member 100, configured as described above, according to Embodiment 2 of the present invention, the axis-direction end face, at the stator side, of the insulation holder 10 is formed in such a way that the inner-diameter portion of the insulation holder 10 is recessed toward the stator-opposite side; thus, the connection member 100 can be disposed in the stator 1 in such a way as to cover the axis-direction end of the stator 1 in the axis direction; as a result, the axis-direction length of the rotating electric machine can be shortened.

Furthermore, because the axis-direction end face, at the stator-opposite side, of the insulation holder 10 is formed in such a way that the inner-diameter portion of the insulation holder 10 protrudes toward the stator-opposite side, the end face, at the stator-opposite side, of the insulation holder 10 macroscopically forms part of a cone that protrudes at the stator-opposite side from the radial-direction outer side to the radial-direction inner side; thus, the insulation holder 10 matches with the inside of a hybrid-car housing whose inner diameter decreases in a conical manner so that it can contain the rotating electric machine. In other words, as illustrated in FIG. 5B, the shape of the housing that contains a rotating electric machine disposed in a space between the engine and the transmission of a hybrid car can be downsized in comparison with a conventional housing.

In the connection member 100 according to Embodiment 2 of the present invention, the outer diameter of the insulation holder 10 is set to be larger than that of the frame 6; thus, when the connection unit has one and the same cross-sectional area, the axis-direction length (height) of the connection member 100 according to Embodiment 2 of the present invention can be set to be small, in comparison with the case where the connection member is disposed in a core-back portion formed between the inner circumference portion of the frame 6 and the outer circumferential surface of an insulating member provided on the outer circumference of the yoke portion of the stator 1; therefore, the axle length of the rotating electric machine can be shortened. As a result, the connection member 100 according to Embodiment 2 of the present invention can contribute to space saving.

Embodiment 3

Figure 3:
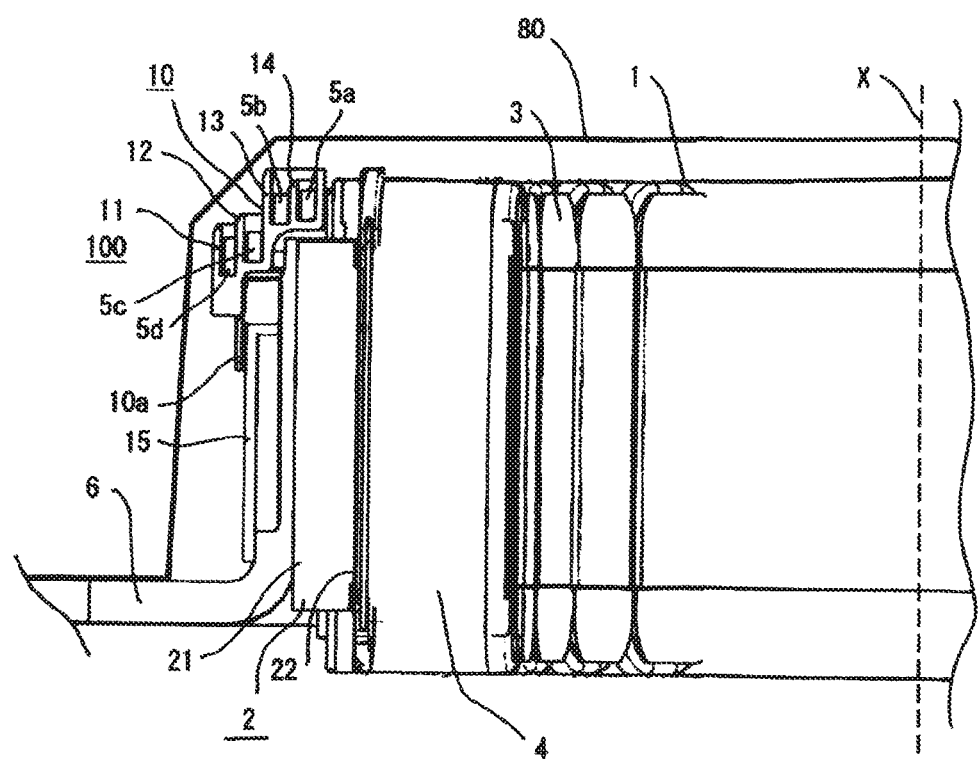
FIG. 3 is a cross-sectional view schematically illustrating the respective structures of a connection member according to Embodiment 3 of the present invention and a stator of a rotating electric machine provided with the connection member.

FIG. 3 is a cross-sectional view schematically illustrating the respective structures of a connection member according to Embodiment 3 of the present invention and a stator of a rotating electric machine provided with the connection member. In FIG. 3, a stator 1 of a rotating electric machine utilized, for example, in a hybrid car is provided with a stator core 2, a bobbin 3, a coil (unillustrated) contained in the bobbin 3, and a connection member 100.

As is the case with Embodiment 1, the stator core 2 is formed of a plurality of core pieces by which the stator core 2 is divided in the circumferential direction. Each of the core pieces has a yoke portion 21 and a tooth portion 22 that protrudes from the yoke portion 21 toward the central portion of the stator 1. The respective tooth portions 22 of the core pieces are arranged around the center axis of the stator 1 in such a way as to be spaced evenly apart from one another.

The yoke portion 21 of each of the core pieces abuts on the yoke portion 21 of the adjacent core piece in the circumferential direction of the stator 1; the yoke portion 21 form the yoke of the stator 1 having a cylindrical shape. Through a predetermined gap, the front end of the tooth portion 22 of each of the core pieces faces the outer circumferential surface of a rotor (unillustrated) provided with a plurality of rotor magnetic poles on the outer circumference portion thereof. The stator 1 having a cylindrical structure is fixed to a frame 6 in such a way as to be pressed into the inner circumference portion of the frame 6 having a cylindrical shape.

The bobbin 3 formed of an insulating material is mounted on the tooth portion 22 of each of the core pieces. The coil 4 is wound around the tooth portion 22 of each of the core piece through the intermediary of the bobbin 3. The connection member 100 formed in a cylindrical shape is mounted on one axle-direction end of the stator 1 at the radial-direction outside of the stator 1 with respect to the coil 4; the connection member 100 is utilized for mutually connecting respective coil-distribution terminals (unillustrated), pulled out from the coils 4, so as to form a stator coil connected, for example, in a three-phase Y-connection manner.

The connection member 100 has an insulation holder 10 made of resin. The insulation holder 10 includes a first holder portion 11 situated at the radial-direction outermost side, a second holder portion 12 that makes contact with the radial-direction inner side of the first holder portion 11, a third holder portion 13 that makes contact with the radial-direction inner side of the second holder portion 12, and a fourth holder portion 14 that makes contact with the radial-direction inner side of the third holder portion 13. The first holder portion 11, the second holder portion 12, the third holder portion 13, and the fourth holder portion 14 are formed in such a way that the respective diameters thereof decrease in that order.

In the insulation holder 10 of the connection member 100, one axis-direction end face, at the stator side, of each of the third holder portion 13 and the fourth holder portion 14 is disposed at a position where the one axis-direction end face of each of the third holder portion 13 and the fourth holder portion 14 faces one axis-direction face end of the yoke portion 21 of the stator core 2; the second holder portion 12 is disposed at a position that is closer to the stator 1 in the axis direction of the stator 1 than each of the third holder portion 13 and the fourth holder portion 14 is; the first holder portion 11 is disposed at a position that is closer to the stator 1 in the axis direction of the stator 1 than the second holder portion 12 is. The axis-direction end face, at the stator side, of the first holder portion 11, i.e., the bottom surface thereof, the axis-direction end face, at the stator side, of the second holder portion 12, i.e., the bottom surface thereof, the axis-direction end face, at the stator side, of the third holder portion 13, i.e., the bottom surface thereof, and the axis-direction end face, at the stator side, of the fourth holder portion 14, i.e., the bottom surface thereof are formed in a stepped manner in such a way as to be recessed toward the stator-opposite side in the axis direction. As illustrated in FIG. 3, the cross section of the insulation holder 10 has a comb-like shape.

The axis-direction end face, at the stator-opposite side, of the first holder portion 11, the axis-direction end face, at the stator-opposite side, of the second holder portion 12, the axis-direction end face, at the stator-opposite side, of the third holder portion 13, and the axis-direction end face, at the stator-opposite side, of the fourth holder portion 14 are formed in a stepped manner in such a way as to protrude toward the stator-opposite side in the axis direction. For example, injection molding is integrally applied to the first through fourth holder portions 11 through 14, so that they are integrally fixed with one another. A fixing part 10a for fixing the insulation holder 10 is disposed in such a way as to abut on the outer circumference of a water jacket 15.

Because the insulation holder 10 of the connection member 100 is formed in such a manner as described above, the axis-direction end face thereof at the stator 1 side, i.e., the bottom surface thereof is formed not in a flat shape but in such a stepped manner as being recessed; the axis-direction end face thereof at the stator-opposite side is formed not in a flat shape but in such a stepped manner as protruding.

In the fourth holder portion 14, there is provided a U-phase bus bar 5a, as a first bus bar, that is disposed in such a way that the transverse direction thereof is in parallel with the direction in which the center axis X of the stator 1 extends and in such a way that the thickness direction thereof is the same as the radial direction of the stator 1. In the third holder portion 13, there is provided a V-phase bus bar 5b, as a second bus bar, that is disposed in such a way that the transverse direction thereof is in parallel with the direction in which the center axis X of the stator 1 extends and in such a way that the thickness direction thereof is the same as the radial direction of the stator 1. In the second holder portion 12, there is provided a W-phase bus bar 5c, as a third bus bar, that is disposed in such a way that the transverse direction thereof is in parallel with the direction in which the center axis X of the stator 1 extends and in such a way that the thickness direction thereof is the same as the radial direction of the stator 1. In the first holder portion 11, there is provided a N-phase bus bar 5d, as a fourth bus bar, that is disposed in such a way that the transverse direction thereof is in parallel with the direction in which the center axis X of the stator 1 extends and in such a way that the thickness direction thereof is the same as the radial direction of the stator 1. The N-phase bus bar 5d is the neutral line of a Y-connection stator coil. It may be allowed that the space where the first through fourth holder portions 11 through 14 are provided is filled with an insulating resin or the like so that the bus bars are completely insulated from the outside.

The U-phase bus bar 5a as the first bus bar, the V-phase bus bar 5b as the second bus bar, and the W-phase bus bar 5c as the third bus bar are formed in such a way as to have approximately the same thickness and width so that the respective cross-sectional areas thereof are approximately the same. The N-phase bus bar 5d, as the fourth bus bar, is formed in such a way as to have a smaller thickness and a larger width than each of the U-phase bus bar 5a, the V-phase bus bar 5b, and the W-phase bus bar 5c has and in such a way as to have a cross-sectional area that is approximately the same as that of each of the U-phase bus bar 5a, the V-phase bus bar 5b, and the W-phase bus bar 5c. The U-phase bus bar 5a, the V-phase bus bar 5b, and the W-phase bus bar 5c can be formed in such a way that the respective thicknesses and the widths thereof are arbitrarily ones; the N-phase bus bar 5d can also be formed in such a way that the thickness and the width thereof are arbitrarily ones.

The respective coil terminals (unillustrated), pulled out from the coils, are selectively connected with the U-phase bus bar 5a, the V-phase bus bar 5b, the W-phase bus bar 5c, and the N-phase bus bar 5d of the connection member 100 so that a three-phase Y-connection, for example, is realized. The U-phase bus bar 5a, the V-phase bus bar 5b, and the W-phase bus bar 5c are connected with an external U-phase power-supply terminal, an external V-phase power-supply terminal, and an external W-phase power-supply terminal (none of them are illustrated), respectively.

In the rotating electric machine, configured as described above, according to Embodiment 3 of the present invention, the coils 4 are mutually connected with one another, as described above, by use of the connection member 100 mounted on the one axis-direction end of the stator 1, so that a predetermined stator coil in the shape of a three-phase Y-connection or the like is formed.

The insulation holder 10 in the connection member 100 according to Embodiment 3 of the present invention is provided with the first holder portion 11, the second holder portion 12, the third holder portion 13, and the fourth holder portion 14; the first, second, third, and fourth holder portions 11 through 14 are formed in such a way that the respective diameters thereof decrease in that order; moreover, the respective axis-direction end faces, at the stator side, of the third holder portion 13 and the fourth holder portion 14 are formed in such a way as to be on the approximately the same plane. With respect to the first holder portion 11, the second holder portion 12, the third holder portion 3, and the fourth holder portion 14 are arranged in such a way as to be shifted to the stator-opposite side in the direction in which the center axis X of the stator 1 extends.

In the connection member 100, configured as described above, according to Embodiment 3 of the present invention, the axis-direction end face, at the stator side, of the insulation holder 10 is formed in such a way that the inner-diameter portion of the insulation holder 10 is recessed toward the stator-opposite side; thus, the connection member 100 can be disposed in the stator 1 in such a way as to cover the axis-direction end of the stator 1 in the axis direction; as a result, the axis-direction length of the rotating electric machine can be shortened.

Furthermore, because the axis-direction end face, at the stator-opposite side, of the insulation holder 10 is formed in such a way that the inner-diameter portion of the insulation holder 10 protrudes toward the stator-opposite side, the end face, at the stator-opposite side, of the insulation holder 10 macroscopically forms part of a cone that protrudes at the stator-opposite side from the radial-direction outer side to the radial-direction inner side; thus, the insulation holder 10 matches with the inside of a hybrid-car housing whose inner diameter decreases in a conical manner so that it can contain the rotating electric machine. In other words, as illustrated in FIG. 5B, the shape of the housing that contains a rotating electric machine disposed in a space between the engine and the transmission of a hybrid car can be downsized in comparison with a conventional housing.

In the connection member 100 according to Embodiment 3 of the present invention, the outer diameter of the insulation holder 10 is set to be larger than that of the frame 6; thus, when the connection unit has one and the same cross-sectional area, the axis-direction length (height) of the connection member 100 according to Embodiment 3 of the present invention can be set to be small, in comparison with the case where the connection member is disposed in a core-back portion formed between the inner circumference portion of the frame 6 and the outer circumferential surface of an insulating member provided on the outer circumference of the yoke portion of the stator 1; therefore, the axle length of the rotating electric machine can be shortened. As a result, the connection member 100 according to Embodiment 3 of the present invention can contribute to space saving.

Furthermore, in the connection member according to Embodiment 3 of the present invention, the fixing part 10a is made to abut on the water jacket 15; thus, heat in the bus bars 5a, 5b, 5c, and 5d can be radiated to the water jacket 15.

Embodiment 4

Figure 4:
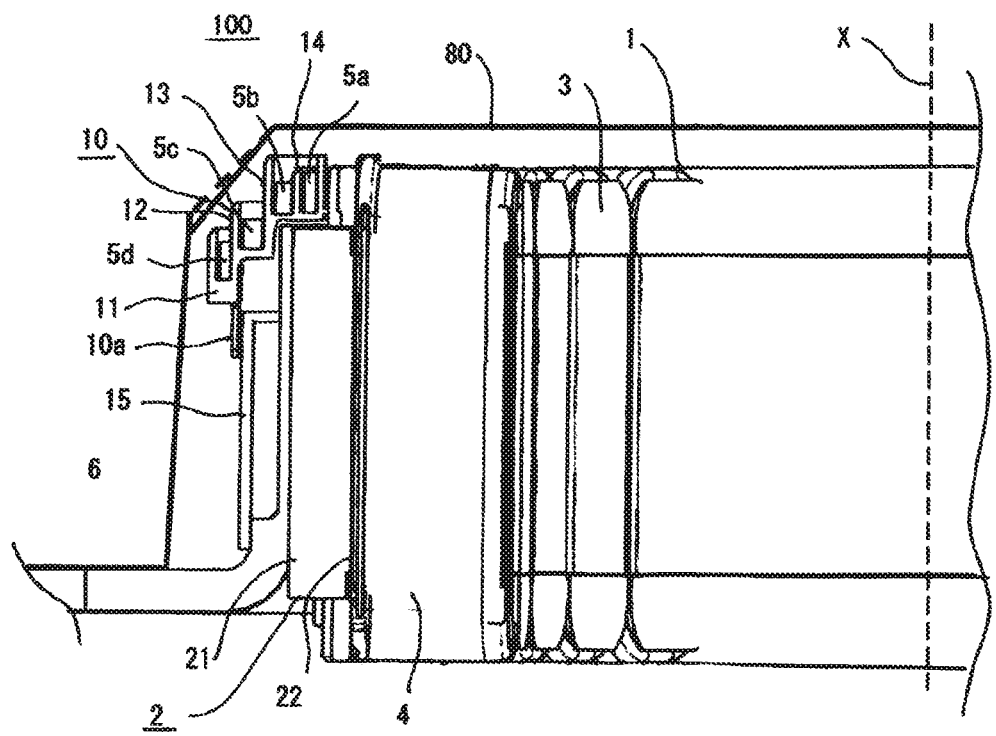
FIG. 4 is a cross-sectional view schematically illustrating the respective structures of a connection member according to Embodiment 4 of the present invention and a stator of a rotating electric machine provided with the connection member.

FIG. 4 is a cross-sectional view schematically illustrating the respective structures of a connection member according to Embodiment 4 of the present invention and a stator of a rotating electric machine provided with the connection member. In FIG. 4, the stator 1 of a rotating electric machine utilized, for example, in a hybrid car and the insulation holder 10 of the connection member 100 are formed in the same manner as the stator 1 and the insulation holder 10 of the connection member 100 in foregoing Embodiment 3 are.

As is the case with Embodiment 3, in the connection member 100 according to Embodiment 4, the U-phase bus bar 5a, the V-phase bus bar 5b, the W-phase bus bar 5c, and the N-phase bus bar 5d are sequentially stacked in order from the fourth holder portion 14 to the first holder portion 11; however, in Embodiment 4, the U-phase bus bar 5a, the V-phase bus bar 5b and the W-phase bus bar 5c are formed in such a way that the respective cross-sectional areas thereof differ from one another; the aspect ratio (height-to-width ratio) sequentially becomes larger in order from the inner-diameter side to the outer-diameter side.

In the connection member 100, configured as described above, according to Embodiment 4 of the present invention, the axis-direction end face, at the stator side, of the insulation holder 10 is formed in such a way that the inner-diameter portion of the insulation holder 10 is recessed toward the stator-opposite side; thus, the connection member 100 can be disposed in the stator 1 in such a way as to cover the axis-direction end of the stator 1 in the axis direction; as a result, the axis-direction length of the rotating electric machine can be shortened.

Furthermore, because the axis-direction end face, at the stator-opposite side, of the insulation holder 10 is formed in such a way that the inner-diameter portion of the insulation holder 10 protrudes toward the stator-opposite side, the end face, at the stator-opposite side, of the insulation holder 10 macroscopically forms part of a cone that protrudes at the stator-opposite side from the radial-direction outer side to the radial-direction inner side; thus, the insulation holder 10 matches with the inside of a hybrid-car housing whose inner diameter decreases in a conical manner so that it can contain the rotating electric machine. In other words, as illustrated in FIG. 5B, the shape of the housing that contains a rotating electric machine disposed in a space between the engine and the transmission of a hybrid car can be downsized in comparison with a conventional housing.

In the connection member 100 according to Embodiment 4 of the present invention, the outer diameter of the insulation holder 10 is set to be larger than that of the frame 6; thus, when the connection unit has one and the same cross-sectional area, the axis-direction length (height) of the connection member 100 according to Embodiment 4 of the present invention can be set to be small, in comparison with the case where the connection member is disposed in a core-back portion formed between the inner circumference portion of the frame 6 and the outer circumferential surface of an insulating member provided on the outer circumference of the yoke portion of the stator 1; therefore, the axle length of the rotating electric machine can be shortened. As a result, the connection member 100 according to Embodiment 4 of the present invention can contribute to space saving.

Furthermore, in the connection member according to Embodiment 4 of the present invention, the fixing part 10a is made to abut on the water jacket 15; thus, heat in the bus bars 5a, 5b, 5c, and 5d can be radiated to the water jacket 15.

The bus bars of the connection member according to Embodiment 4 are formed in such a way that the closer to the inner-diameter side the bus bar is situated, the larger the width, i.e., the axis-direction length thereof becomes; thus, even when the bottom surface of the insulation holder 10, i.e., the axis-direction end face thereof at the stator side is flat, it is made possible that the closer to the center axis X, the more the axis-direction end face, at the stator-opposite side, of the connection member 100 protrudes in a stepped manner toward the stator-opposite side.

Each of the rotating electric machines according to foregoing Embodiments of the present invention is the one obtained by putting the following inventions into practice. It goes without saying that in the scope of the present invention, the rotating electric machines according to Embodiments thereof may appropriately be combined.

(1) A rotating electric machine comprising:

a stator having a stator core that includes a yoke portion formed in the shape of a ring and a plurality of tooth portions extending from the yoke portion to the radial-direction inner side of the yoke portion and that contains a rotor in the inner space thereof;

a plurality of coils mounted on the plurality of tooth portions; and a connection member, formed in the shape of a ring, that is disposed on at least one axis-direction end of the stator and that mutually connects the plurality of coils so as to form a predetermined stator coil, wherein the axis-direction end face, at the stator-opposite side, of the connection member is formed in such a way that at a plurality of different positions in the radial direction of the connection member, the axis-direction positions of the connection member differ from one another.

In the present invention, the axis-direction position of the connection member, for example, the axis-direction position of the portion that is situated at a position that is closest to the outer circumference thereof is adjusted, so that it is made possible to secure clearance between the inside of a housing and the connection member.

(2) The rotating electric machine according to (1),
wherein the connection member has an insulation holder formed in the shape of a ring and a plurality of bus bars that are each held by the insulation holder at the different positions in the radial direction, and
wherein each of the plurality of bus bars is formed in the shape of a rectangle whose thickness direction extends in the radial direction and whose width direction extends in the axis direction.

In the present invention, for example, the thickness and the width of the bus bar that is situated at a position that is closest to the outer circumference thereof are adjusted, so that the axis-direction position of the connection member, for example, the axis-direction position of the portion that is situated at a position that is closest to the outer circumference thereof can be adjusted; thus, it is made possible to secure clearance between the inside of a housing and the connection member.

(3) The rotating electric machine according to (2), wherein at least one of the plurality of bus bars is formed in such a way that the thickness and the width thereof differ from the thickness and the width of each of the other bus bars.

In the present invention, for example, the thickness and the width of the bus bar that is situated at a position that is closest to the outer circumference thereof are adjusted, so that the axis-direction position of the connection member, for example, the axis-direction position of the portion that is situated at a position that is closest to the outer circumference thereof can be adjusted; thus, it is made possible to secure clearance between the inside of a housing and the connection member.

(4) The rotating electric machine according to (2), wherein the plurality of bus bars are formed in such a way that the respective thicknesses thereof differ from one another and the respective widths thereof differ from one another.

In the present invention, for example, the thickness and the width of the bus bar that is situated at a position that is closest to the outer circumference thereof are adjusted, so that the axis-direction position of the connection member, for example, the axis-direction position of the portion that is situated at a position that is closest to the outer circumference thereof can be adjusted; thus, it is made possible to secure clearance between the inside of a housing and the connection member.

(5) The rotating electric machine according to (2), wherein the plurality of bus bars are formed in such a way that the more outward in the radial direction the bus bar is disposed, the larger the width thereof becomes.

In the present invention, the axis-direction position of the axis-direction end face, at the stator-opposite side, of the connection member is made to change at different positions in the radial direction thereof, so that even when the axis-direction end face, at the stator side, of the insulation holder is flat, it is made possible to make the connection member match with the shape of the housing; thus, the easiness of conducting layout can be enhanced.

(6) The rotating electric machine according to any one of (1) through (5),
wherein the connection member mutually connects the plurality of coils so as to form a three-phase Y-connection stator coil, and
wherein the plurality of bus bars include a U-phase bus bar, a V-phase bus bar, a W-phase bus bar, and a neutral-line bus bar.

(7) The rotating electric machine according to (6), wherein the neutral-line bus bar is disposed at a more outer position in the radial direction than any of the other bus bars is.

In the present invention, because the neutral-line bus bar, the cross-sectional area of which does not need to be made larger than the cross-sectional area of each of the bus bars of the other phases, is disposed at the outmost position in the radial direction, the diameter of the connection member can be reduced; thus, the axis-direction length thereof can be shortened.

(8) The rotating electric machine according to any one of (1) through (7), wherein the connection member has a diameter that is larger than the diameter of the stator.

In the present invention, the diameter of the insulation holder is made larger than that of the frame, so that in comparison with the case where the connection member is disposed inside the frame, the cross-sectional area of the connection member can be made large, without reducing the diameter of the stator; thus, the cross-sectional area of the bus bar can be made larger and hence it is made possible to deal with a large electric current.

(9) The rotating electric machine according to (8), wherein at least the portion, of the connection member, that is situated at a position that is closest to the outer circumference thereof is at the stator side in the axis direction with respect to the axis-direction end face of the stator.

In the present invention, the connection member can enclose part of the outer circumferential surface of the stator core, thereby enabling the axis-direction length of the rotating electric machine to be reduced.

(10) The rotating electric machine according to any one of (8) and (9), wherein through a water jacket disposed on the outer circumference portion of the stator, the connection member is fixed to a frame for fixing the stator.

In the present invention, the connection member is fixed to the frame through the water jacket; thus, heat in the connection member can be transferred to the water jacket and hence there is demonstrated an effect that the cooling efficiency is enhanced.

INDUSTRIAL APPLICABILITY

The present invention can be applied to the field of a rotating electric machine, especially to a rotating electric machine utilized in a hybrid car, and eventually to the field of the automobile industry.

DESCRIPTION OF REFERENCE NUMERALS

1: stator
2: stator core
21: yoke portion
22: tooth portion
3: bobbin
4: coil
41: coil terminal
5a: U-phase bus bar
5b: V-phase bus bar
5c: W-phase bus bar
5d: N-phase bus bar
100: connection member
10: insulation holder
10a: fixing part of insulation holder
11: first holder portion
12: second holder portion
13: third holder portion
14: fourth holder portion 15: water jacket
50: engine
60: transmission
70: rotating electric machine
80: housing

The invention claimed is:

1. A rotating electric machine comprising:
a stator having a stator core that includes a yoke portion formed in the shape of a ring and a plurality of tooth portions extending from the yoke portion to the radial-direction inner side of the yoke portion and that contains a rotor in the inner space thereof;
a plurality of coils mounted on the plurality of tooth portions;
a connection member, formed in the shape of a ring, that is disposed on at least one axis-direction end of the stator and that mutually connects the plurality of coils so as to form a predetermined stator coil; and
a plurality of annular insulation holders, each of the plurality of annular insulation holders containing the connection member and comprising a first exterior surface that faces the stator and a second exterior side that opposes the first exterior surface,
wherein an axis-direction end face, at a stator-opposite side, of the connection member is formed in such a way that at a plurality of different positions in the radial direction of the connection member, axis-direction positions of the connection member differ from one another,
wherein the connection member has a diameter that is larger than the diameter of the stator core,
wherein at least a portion, of the connection member, that is situated at a position that is closest to an outer circumference thereof is at a stator core side in the axis direction with respect to the axis-direction end face of the stator, and
wherein the axis-direction end face of the plurality of annular insulation holders iswe shifted in a stepwise manner, at the stator side and the stator-opposite side, so that axis-direction positions of the first exterior surfaces of plurality of annular insulation holders are different from one another, and axis-direction positions of the second exterior surfaces of plurality of annular insulation holders are different from one another.

2. The rotating electric machine according to claim 1, wherein the connection member comprises a plurality of bus bars that are held by the plurality of annular insulation holders at the different positions in the radial direction, and
wherein each of the plurality of bus bars is formed in the shape of a rectangle whose thickness direction extends in the radial direction and whose width direction extends in the axis direction.

3. The rotating electric machine according to claim 2, wherein at least one of the plurality of bus bars is formed in such a way that the thickness and the width thereof differ from the thickness and the width of each of the other bus bars.

4. The rotating electric machine according to claim 2, wherein the plurality of bus bars are formed in such a way that the respective thicknesses thereof differ from one another and the respective widths thereof differ from one another.

5. The rotating electric machine according to claim 2, wherein the plurality of bus bars are formed in such a way that the more outward in the radial direction the bus bar is disposed, the larger the width thereof becomes.

6. The rotating electric machine according to claim 1, wherein the connection member mutually connects the plurality of coils so as to form a three-phase Y-connection stator coil, and
wherein the plurality of bus bars include a U-phase bus bar, a V-phase bus bar, a W-phase bus bar, and a neutral-line bus bar.

7. The rotating electric machine according to claim 6, wherein the neutral-line bus bar is disposed at a more outer position in the radial direction than any of the other bus bars is.

8. The rotating electric machine according to claim 1, wherein through a water jacket disposed on the outer circumference portion of the stator, the connection member is fixed to a frame for fixing the stator.

* * * * *